(12) United States Patent
Carter et al.

(10) Patent No.: US 6,471,362 B1
(45) Date of Patent: Oct. 29, 2002

(54) MIRROR WITH IMPROVED BUTTON CONSTRUCTION

(75) Inventors: John W. Carter, Holland; Kenton J. Ypma, Grand Rapids; Wayne J. Rumsey, Holland, all of MI (US)

(73) Assignee: Gentex Corporation, Zeeland, MI (US)

( * ) Notice: Subject to any disclaimer, the term of this patent is extended or adjusted under 35 U.S.C. 154(b) by 73 days.

(21) Appl. No.: 09/687,743

(22) Filed: Oct. 13, 2000

(51) Int. Cl.$^7$ ............................................. G02B 7/182
(52) U.S. Cl. ...................... 359/871; 359/872; 359/838; 359/850
(58) Field of Search .................. 359/871, 872, 359/838, 850, 854, 876, 877; 248/475.1, 475 R, 479, 476, 480, 488

(56) References Cited

U.S. PATENT DOCUMENTS

| | | |
|---|---|---|
| 4,035,593 A | 7/1977 | Riniker |
| 4,131,991 A | 1/1979 | Riniker |
| 5,285,060 A | 2/1994 | Larson et al. |
| 5,576,687 A | 11/1996 | Blank et al. |
| 5,669,698 A | 9/1997 | Veldman et al. |
| D391,214 S | 2/1998 | Hook et al. |
| D402,950 S | 12/1998 | Fitzpatrick |
| 5,920,150 A | 7/1999 | Crary et al. |
| 6,000,823 A | 12/1999 | Desmond et al. |
| 6,026,162 A | 2/2000 | Palett et al. |

*Primary Examiner*—Mohammad Sikder
(74) *Attorney, Agent, or Firm*—Brian J. Rees; Price Heneveld Cooper Dewitt & Litton

(57) ABSTRACT

An electrified rearview mirror includes a housing supporting a rearview mirror subassembly, and a bezel attached to the housing. The bezel includes a section of material defining a plurality of three-sided button openings on a face of the bezel, with the openings extending onto a bottom wall of the housing. A push-button is pivotally supported in each opening, with the hinge axis of the push-buttons being at a low position on the respective buttons so that the buttons are not accidentally depressed when the mirror housing is grasped by a vehicle driver to adjust an angle of the mirror. The bezel and buttons include pairs of tabs and mating slots that form a quick-attach bottom pivot, and further include stops and hooks at their top that form stroke-limiting mechanisms for controlling button movement. The buttons can be operably snapped into position on the bezel with minimal assembly time. A finger rail depression extends along the bottom wall of the housing parallel the buttons to facilitate a driver sliding his/her fingers along the mirror to a desired position for selecting a particular button to depress. Further, the buttons include feel locators that help the driver identify particular buttons without looking at the buttons.

30 Claims, 5 Drawing Sheets

MIRROR WITH IMPROVED BUTTON CONSTRUCTION

BACKGROUND OF THE INVENTION

The present invention relates to electrified mirrors with actuation buttons for activating circuits and functions in a vehicle.

An increasing number of vehicle electronics are being packaged in interior rearview mirrors. The reasons are many and varied, but are closely related to the fact that the interior rearview mirror location, which is relatively high and near the vehicle front windshield, provides good physical and visual accessibility, low electromagnetic noise and in turn, good undistorted signal-receiving capability, and proximity to the vehicle exterior (which facilitates multiple functions such as compass/direction sensing, global position sensing, temperature sensing, daylight sensing, sensing of glaring light such as bright headlamps, keyless entry, passenger airbag on/off control, telecommunication functions, and the like). However, the amount of features and options that can be put into a mirror are limited because a size of rearview mirrors is limited. Specifically, the area of a mirror's reflective surface must be large enough horizontally and vertically so that a driver can see enough to recognize what is behind him or her. At the same time, the total vertical dimension of a mirror must be short enough so that the driver can see under the mirror out the vehicle's front window. The resulting area on a face of the mirror under the reflective surface area (sometimes called a "chin" herein) is relatively small in a vertical direction.

A problem occurs because "framed" buttons positioned in the "chin" area are forced to be "too small" from an ergonomic point of view. "Framed" buttons, as used herein, are buttons that are surrounded on four sides by a fixed marginal material so that the button is fully contained or bordered. Four-sided framing of buttons is desirable because the button is captured in a manner so that its movement is restricted to a perpendicular "button-depressing" direction only. Captured or "framed" buttons also have a reduced tendency to rattle. A problem is that, when buttons are ergonomically "too small", vehicle drivers tend to miss-hit them (i.e. press the wrong button), or the vehicle drivers simply cannot find or actuate the correct button. Miss-hit buttons can be a particularly frustrating problem at nighttime or in darkness since drivers have difficulty seeing and identifying symbols and letters on the small buttons. Also, there is often not enough room on the mirror face adjacent the button to place adequately-sized, recognizable identification symbols or identifying letters. For example, one known mirror was specified to have a vertical height of at least two inches in a critical central area of its reflective viewing area. Simultaneously, the "chin" area on that mirror was specified to be about 21.5 mm. The button, which was framed on all four of its sides, had a height limited to 8 mm, which is only about 37% of the available space on the "chin" area. One reason was because of the structural requirements of the four sides that define the button opening. Specifically, there must be sufficient width and structure in the "framing" material on all four sides of the button opening to prevent breakage and warranty. The breakage and warranty could be caused by several different factors, such as by excessive force received from a vehicle driver mis-hitting the button frame while attempting to depress a button on the mirror. A solution is desired that will permit buttons to be enlarged for more easy selection and actuation, while still meeting the decor, function, strength, and inherent small size requirements of interior rearview mirrors.

Another problem occurs as multiple functions and features are added to interior rearview mirrors. Multiple functions and features result in multiple push-buttons on the mirror for turning "on" and "off" the different functions and features. It is preferable for drivers to be able to select a particular button from a plurality of buttons without having to look away from his/her driving and at the mirror for any length of time. Even more preferable, it is desirable that the driver doesn't have to look at the mirror at all in order to select a desired push-button. This is important since such a distraction can adversely affect safe driving.

Yet another problem can occur when a driver grasps a mirror to adjust an angle of the mirror, since the driver can accidentally depress and actuate buttons. This is another reason why four-sided framing of button are traditionally desired, because, in theory, there is less likelihood of accidentally depressing a button when the button is shielded on all four of its sides.

Accordingly, an apparatus is desired solving the aforementioned problems and having the aforementioned advantages.

In one aspect of the present invention, a rearview mirror includes a housing adapted to support a rearview mirror subassembly, and a bezel attached to and partially covering a front of the housing. The bezel includes a section of material defining a three-sided button opening having an open side on a face of the bezel. A button is positioned in the three-sided button opening and is operably supported therein for movement between a switch-actuating position and a non-actuating position.

In another aspect of the present invention, a rearview mirror includes a housing adapted to support a rearview mirror subassembly, and a bezel attached to and partially covering a front of the housing, where the bezel includes a section of material defining a button opening on a face of the bezel. One of the housing and the bezel include an exterior surface that extends away from the face, and the button opening extends from the face around onto the exterior surface. A button is positioned in the button opening and is operably supported by one of the housing and the bezel for movement between a switch-actuating position and a non-actuating position. The button includes a front first surface that is generally flush with the face of the bezel when the button is in the actuating position and further includes a second surface that is generally flush with the exterior surface of the bezel when the button is in the non-actuating position.

In another aspect of the present invention, a rearview mirror includes a housing adapted to support a rearview mirror subassembly, and a bezel attached to and partially covering a front of the housing, where the bezel includes a section of material defining a button opening on the bezel. A button is positioned in the button opening and is operably supported therein for movement between a switch-actuating position and a non-actuating position. A feel-and-locate feature is formed on one of the housing, the bezel and the button. The feel-and-locate feature is aligned with the button and configured and adapted so that a vehicle operator can identify a location of the button by feel without the vehicle operator having to look at the button.

In another aspect of the present invention, a bezel is provided that is adapted to attach to and cover a front edge of a mirror housing for a rearview mirror, where the mirror housing is adapted to support a rearview mirror subassembly. The bezel includes a ring-shaped body with top, bottom, and sidewall sections forming a loop. At least one of the wall sections includes a face and an exterior surface that extends away from the face. The face includes marginal material defining a button opening that extends from the face onto the exterior surface. A button is positioned in the button opening and is operably supported for limited movement by the marginal material of the bezel between a switch-actuating position and a non-actuating position.

In another aspect of the present invention, a rearview mirror includes a housing adapted to support a rearview mirror subassembly, and a loop-shaped bezel attached to and partially covering a front of the housing, where the bezel includes a section of material defining a button opening on a face of the bezel. A button is snap attached into the button opening and is operably pivotally supported for limited movement by one of the housing and the bezel for movement between a switch-actuating position and a non-actuating position In another aspect of the present invention, a rearview mirror adapted for use in passenger vehicles includes a housing and a rearview mirror subassembly supported in the housing. The rearview mirror subassembly includes a reflector adapted to reflect images to a vehicle driver so that the vehicle driver can see toward a rear of the vehicle without turning his/her head. The reflector provides a reflective viewing area with a bottom edge. A bezel is attached to and partially covers a front of the housing and of the mirror subassembly. The bezel includes a "chin" section of material below the bottom edge of the reflective viewing area that defines a button opening on a face of the bezel, with a vertical dimension of the button opening being at least 75% of a predetermined vertical dimension of the "chin" area.

In yet another aspect of the present invention, a rearview mirror includes a housing supporting a rearview mirror subassembly, and a bezel attached to and partially covering a front of the housing and of the rearview mirror subassembly. One of the housing and the bezel defines a plurality of button openings on a face of an assembly of the housing and the bezel. A plurality of buttons are positioned in the button openings and are operably supported therein for movement between a switch-actuating position and a non-actuating position. The housing further includes a difficult-to-see lower rear surface defining an elongated finger rail that is spaced from and extends parallel a line defined by the plurality of buttons. The finger rail provides a feature along which a vehicle driver can slide his/her fingers when the vehicle driver is searching by feel for a particular one of the buttons.

One object of the present invention is to provide a mirror with buttons, where the buttons are surprisingly and unexpectedly large and accessible, despite a relatively small area under the reflective viewing area on a face of the mirror.

Another object is to provide a mirror with buttons, where a finger rail and locator features on the mirror and/or the buttons allows a vehicle driver to select and operate buttons without having to look at and visually identify a particular button.

Another object is to provide a mirror with buttons, where the buttons have accessible surfaces on the face and bottom of the mirror, but where the buttons are pivoted to the mirror in a manner that reduces or eliminates the likelihood of the buttons being accidentally actuated when the driver grasps the mirror for adjusting an angle of the mirror.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
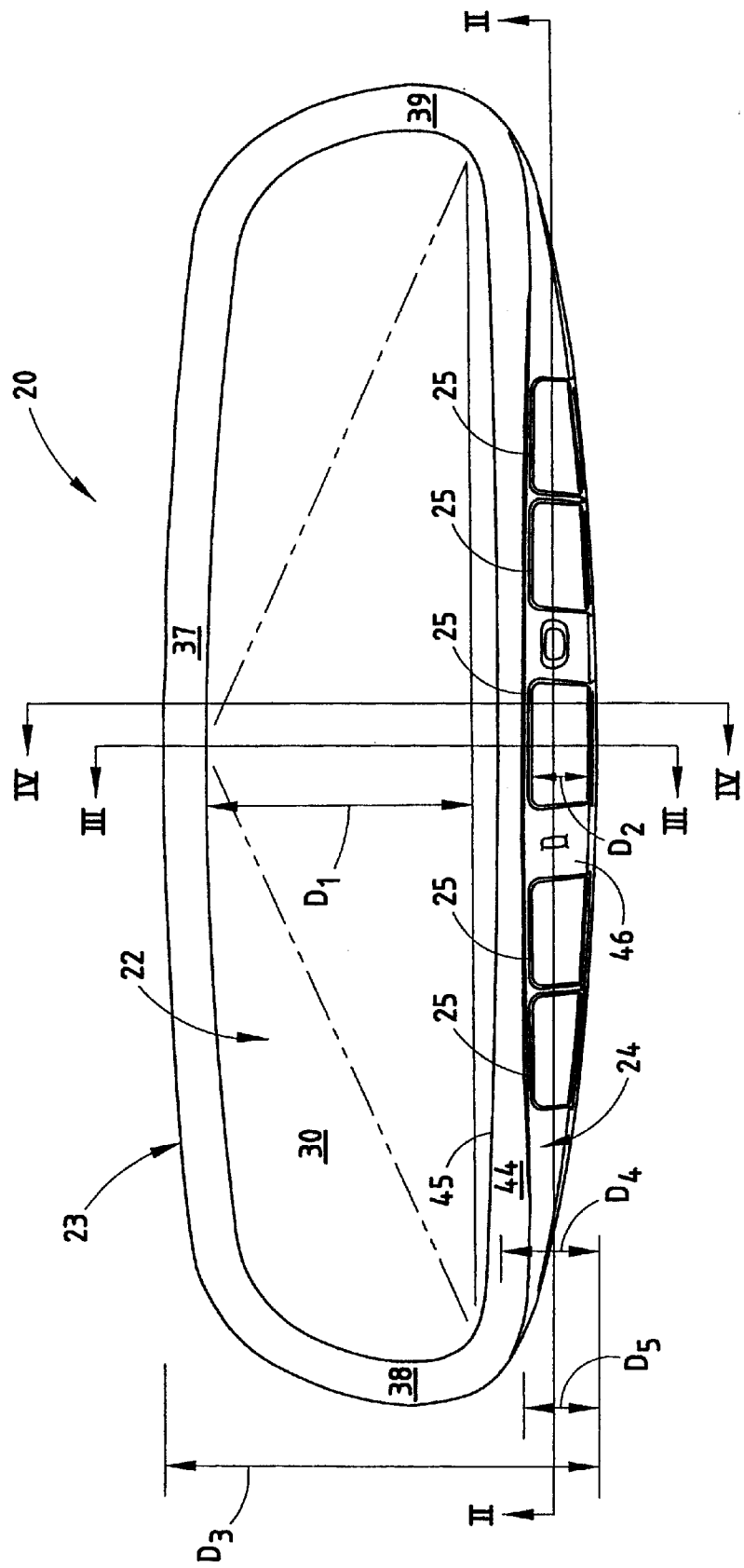
FIG. 1 is a front view of a rearview mirror embodying the present invention.
Figure 3:
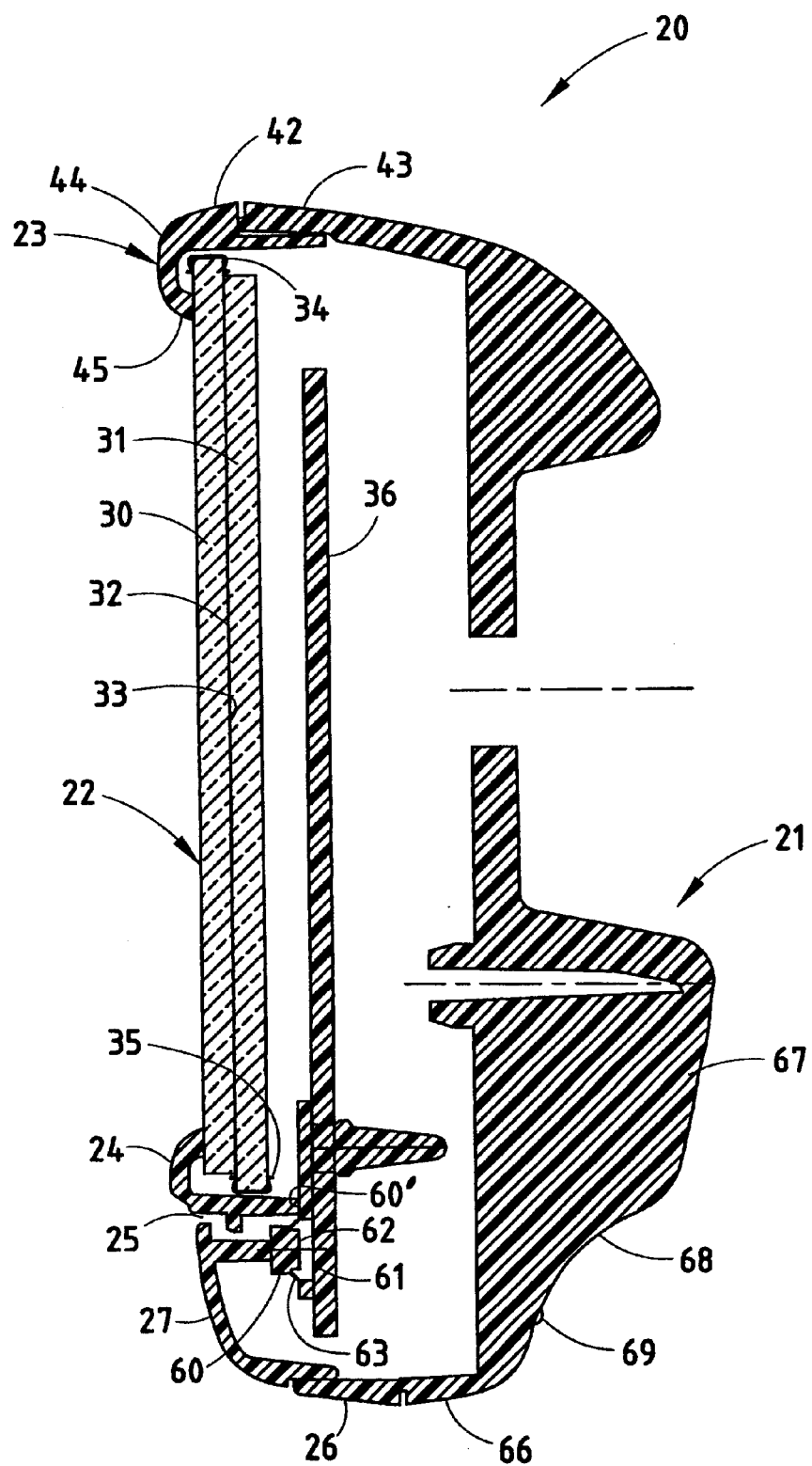
Figure 4:
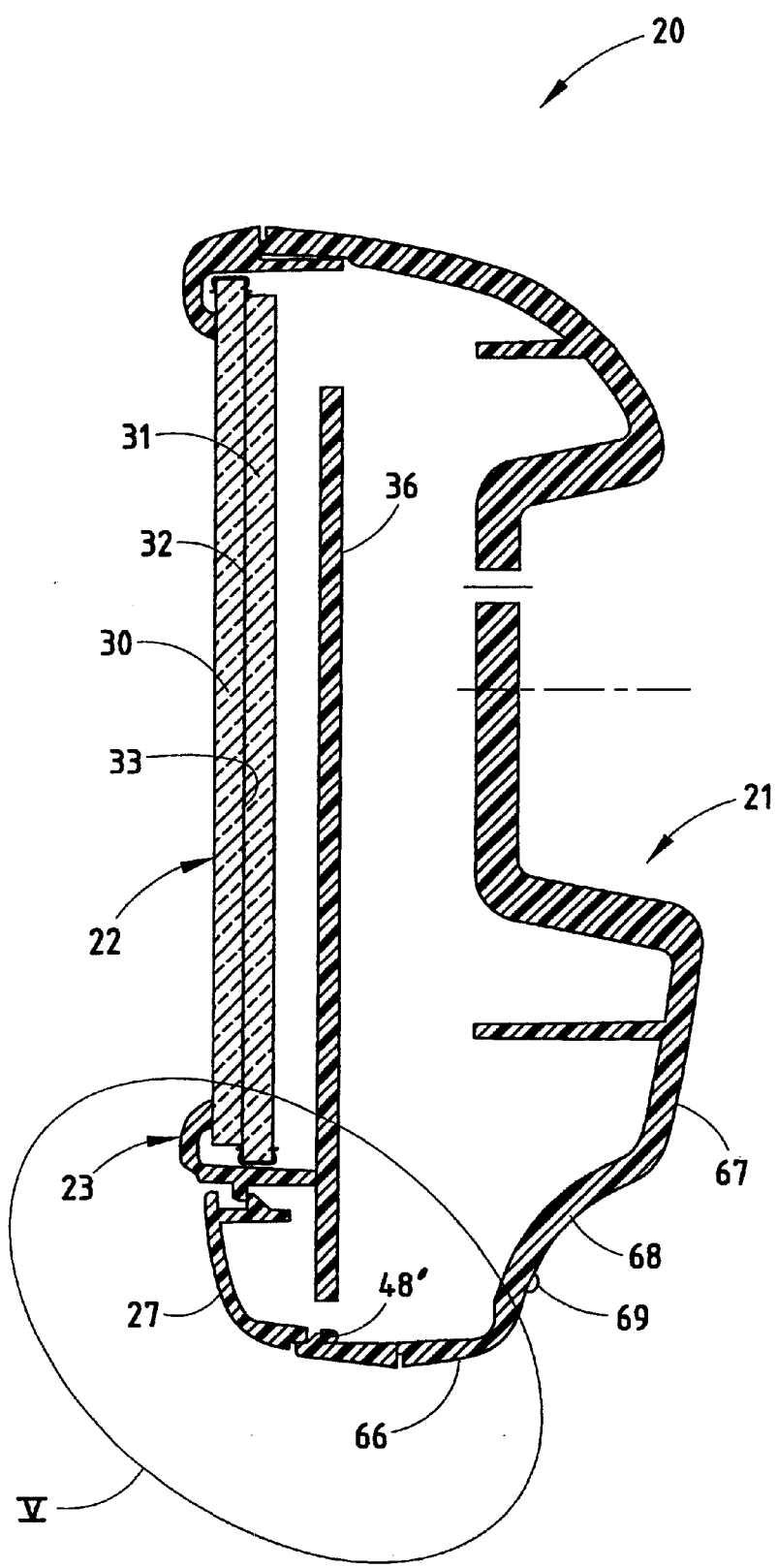

An electrified rearview mirror 20 (FIG. 1) includes a housing 21 (FIG. 3) supporting a rearview mirror subassembly 22, such as the illustrated electrochromic (EC) mirror having multiple electronic functions therein. A bezel 23 is attached to and covers a front edge of the housing 21 and also covers a perimeter portion of the mirror subassembly 22. The bezel 23 includes a bottom wall section 24 (FIG. 1) defining a plurality of three-sided button openings 25 on a face of the bezel 23, with the openings 25 extending onto a rearwardly extending bottom flange 26 of the bottom wall section 24. Push-buttons 27 are pivotally supported in the opening 25, with the hinge axis of each push-button 27 being at a low and rearwardly-spaced position on the respective buttons 27. This helps prevent the buttons 27 from being accidentally depressed, such as may happen when the mirror housing 21 is grasped by a vehicle driver tying to adjust an angle of the mirror 20. Specifically, the pivot is located at a bottom point where the driver's bottom finger pressure will bear directly against the pivot axis, and thus the button will not be accidentally depressed or pivoted as the mirror is adjusted.

A shape of the buttons 27 and the openings 25 is significant in the present mirror 20. Specifically, the shape of the buttons 27, including their lower portion, which wraps under the mirror, permits the buttons 27 to be made surprisingly and substantially larger in size than similar mirror constructions where the button is framed on four sides on a face of a mirror. For example, the illustrated buttons 27 can be made up to 12.5 mm tall (or taller) in vertical height $D_2$ (FIG. 1) on a face of a mirror having a dimension $D_3$ of about 75 mm, even where the "chin" section is specified to have a vertical dimension $D_4$ of about 20 mm, where the "button" panel area of the "chin" section has a vertical dimension $D_5$ of about 15 mm, and where the specified reflective portion $D_1$ is at least about 51 mm at its center point. (i.e. $D_2/D_4 > 50\%$, or more preferably $D_2/D_4 = 62.5\%$, $D_2/D_5 > 50\%$, or more preferably $D_2/D_5 > 80\%$, and $D_2/D_3 > 15\%$ and more preferably $D_2/D_3 > 16\%$ in front view). This would not be possible in most mirrors due to a limitation on the chin section ($D_5$) and the total assembly height dimension ($D_3$). Further, the three-sided button opening 25 has an open bottom side on the face that permits much easier access than with traditional four-sided framed buttons, due to its open bottom side. Still further, when the exposed bottom surface of the button 27 is combined with the button's front face, the new button construction provides an enlarged target with two directions of access. The phrase "two directions of access" is intended to refer to access to a face of the buttons 27 from a front and a bottom direction, as permitted by the three-sided opening, keeping in mind that the button axis, which is below and slightly rearward of a face of the buttons 27, limits "vertical" actuation of the buttons 27. Notably, the "low" and "rearward" location of the button pivot axis prevents the open bottom side from causing problems from accidental depression, as discussed below.

It is noted that traditional button constructions on mirrors are framed on all four sides in order to better "capture" the buttons to prevent rattling and to provide for smooth operation. The material forming the "frame" must be sufficient to maintain its shape, and to withstand forces that occur when in use. Most "frame" sections are about 2.0 mm thick. This forces the area around a button to take up area that would otherwise be used by the button itself. In the present example, the button 27 is made at least 2 mm larger by elimination of the framing section at a bottom of the button opening 25. Still further, in the present example, the button 27 is made even larger due to total elimination of the bottom wall on a face of the bezel 23.

To summarize, the "three-sided button opening" design results in larger buttons 27 that are better able to meet ergonomic and identification demands of modern consumers, while still permitting the total mirror size and chin area to remain within limited manufacturing size specifications. The present button arrangement further permits snap-assembly to the bezel, thus saving assembly costs, as discussed below.

Interior rearview mirrors, including electrochromic mirror constructions and mirror constructions with internal electrical circuits and components are generally known in the art, and the details of the same do not need to be described extensively herein for a person of ordinary skill to understand the present invention. It is sufficient to note that the present mirror subassembly 22 includes front and rear glass elements 30 and 31 (FIG. 3), an electrochromic (EC) material 32, a reflector layer 33 (on either a front or rear surface of the rear glass element 31), and electrical conductors 34 and 35. A printed circuit (PC) board 36 is located in the housing 21, and includes a circuit thereon for causing an electrical potential across the EC material 32 to darken reflected images, such as when bright glaring headlights are sensed at night. The printed circuit board 36 potentially further includes multiple circuits, such as for supporting functions such as compass/direction sensing, global position sensing, temperature sensing, daylight sensing, sensing of glaring light such as bright headlamps, keyless entry, passenger airbag on/off control, garage door control function and transmitting, telecommunication functions, and the like. These additional functions may be supported by circuits that are partially or completely on the PC board 36 or in the housing 21. The present inventive button construction concerns buttons operably mounted on the mirror 20 that are adapted to provide on/off control and selection of these various circuits and functions.

Bezel 23 is loop-shaped, and includes top and side wall sections 37–39 (FIG. 1) that combine with bottom wall section 24 to cover a perimeter of the mirror subassembly 22 and to cover the front edge of the housing 21. Each of the wall sections 37–39 and 24 include an aesthetic perimeter face flange 44 (FIG. 3) that extends around a perimeter of the mirror subassembly 22, and a resilient sealing flange 45 that engages a front surface of the front glass element 30. Each of the wall sections 37–39 and 24 further include a rearwardly extending bottom flange 42 (see FIG. 3) that overlappingly engages a front edge 43 of the housing 21. The overlapping portions preferably include mating resilient hook and aperture connectors (not specifically shown) for providing snap attachment of the bezel 23 to the housing 21, although it is noted that other connecting mechanisms can also be used.

In the bottom wall section 24, there is an extended face flange 46 (FIG. 1) that extends downwardly from the aesthetic perimeter face flange 44. Also, the bottom flange 42 is extended rearwardly a significant distance. The illustrated bezel 23 includes marginal material forming five button openings 25, each of which include a face portion in the extended face flange 46 and a bottom portion in the rearwardly extending bottom flange 42 of the bottom wall section 24. It should be apparent that more or less button openings can be formed. The illustrated button openings 25 are three-sided on the face of the bezel 23, and include a downwardly open bottom edge. Thus, the button openings 25 permit access to the buttons 27 both from the face and also from a bottom of the bezel 23.

Figure 5:
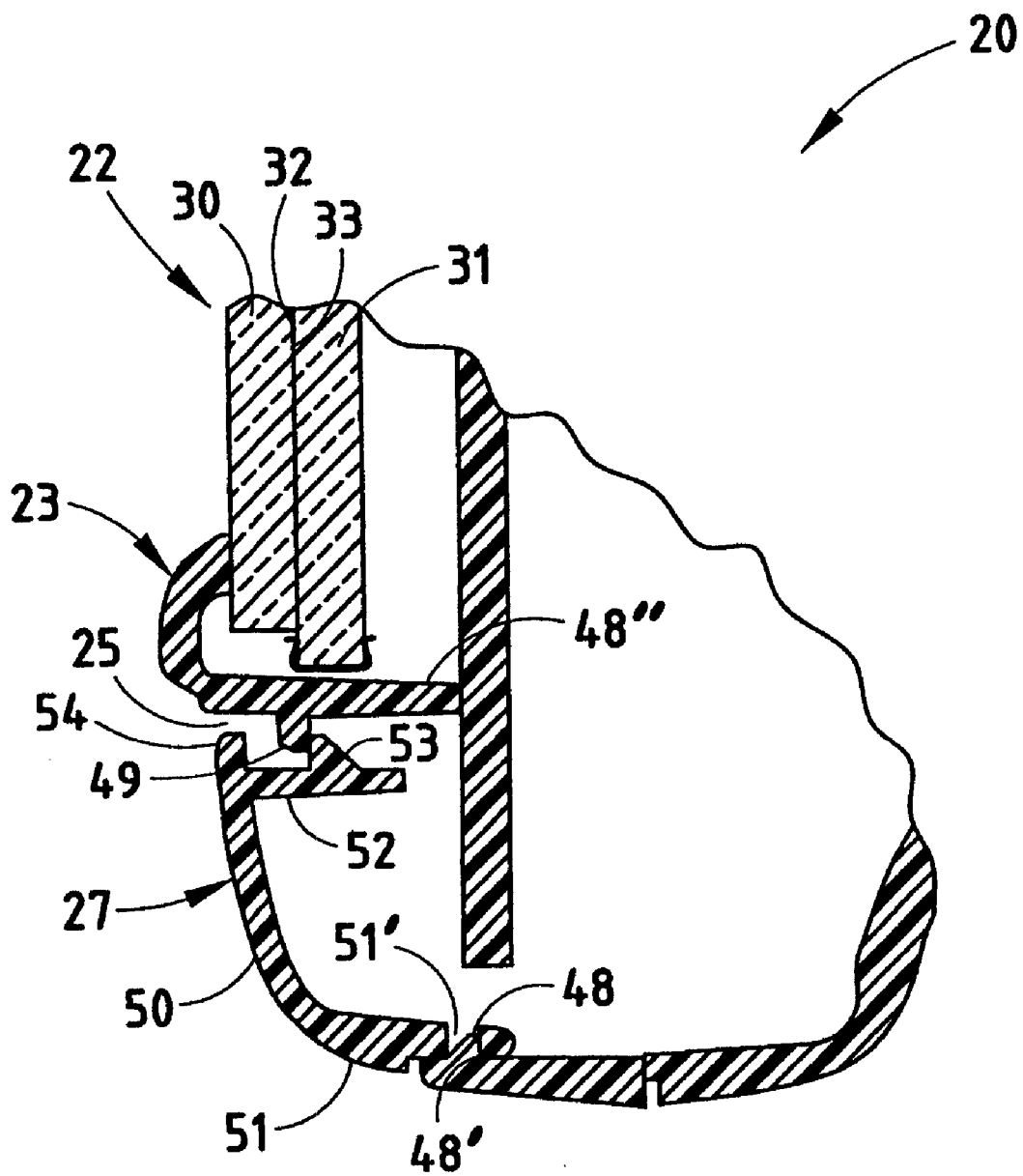
FIG. 5 enlargement of the circled area V in FIG. 4.

The button-to-bezel connection is believed to be particularly novel in the present mirror arrangement. The rearwardly extending bottom flange 42 of bezel 23 includes a pair of spaced-apart hinge tabs 48 (FIG. 5) that extend upwardly into the button opening 25. The hinge tabs 48 define a hinge axis 48' located at a bottom of the buttons 27 at a location rearward of a face of the bezel 23. This reduces the likelihood of a person accidentally depressing a button 27 when adjusting the mirror 20. A rearwardly extending intermediate flange 48" extends rearwardly from a lower edge of the bottom face flange 44, and a stop flange 49 extends downwardly from the intermediate flange 48" into the button opening 25. Button 27 includes a front wall 50 having a face that, when the button 27 is in a switch non-actuating position, extends generally flush with the front surface of the bezel 23, and further includes a bottom wall 51 with a bottom exterior surface that, when the button 27 is in a non-actuating position, extends generally flush with the bottom flange 42 of the bezel 23. The term "generally flush" is intended to mean that the button surface can be proud (i.e. raised) or recessed from the bezel surfaces, such as one or a few millimeters raised or recessed, and still be within a scope of the present invention.

Figure 2:
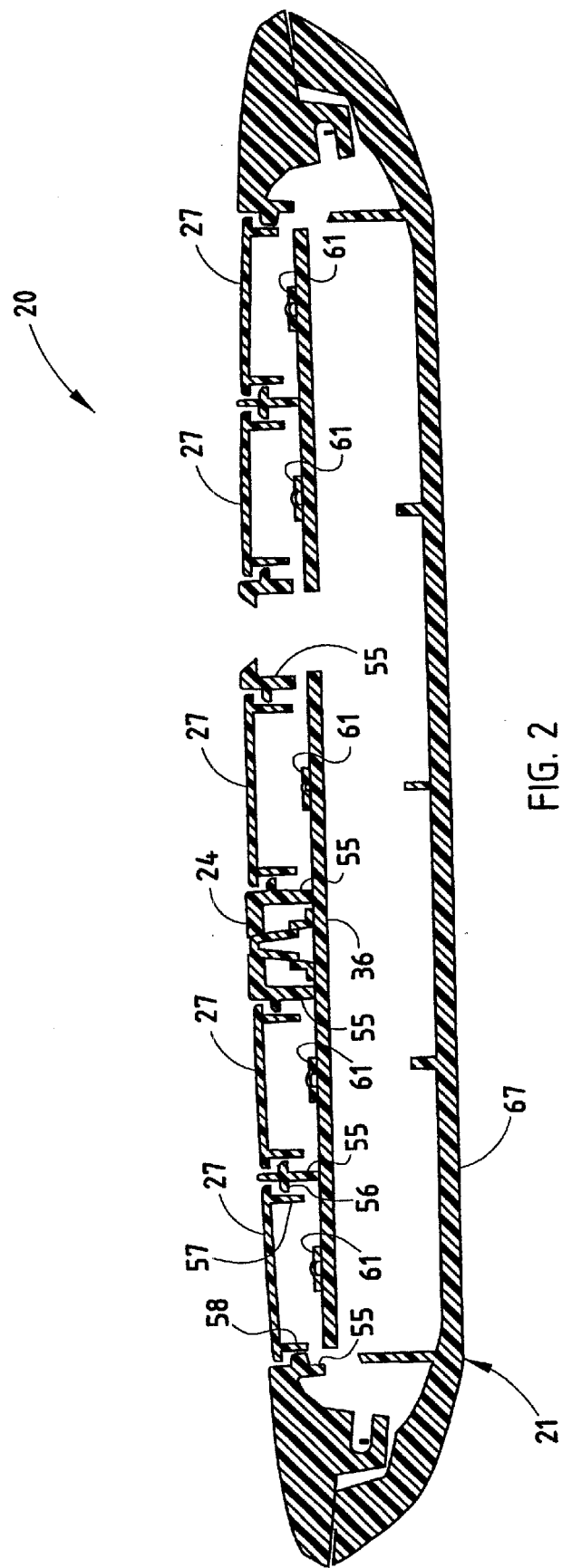
FIGS. 2, 3, and 4 are cross-sections taken along the lines II—II, III—III, IV—IV in FIG. 1.

The bottom wall 51 includes a pair of horizontal slots 51' that matably engage the hinge tabs 48 to pivotally mount the button 27 to the bezel 23 in the opening 25. The button 27 further includes a top wall 52 that extends parallel the intermediate flange 48". A hook 53 on the top wall 52 engages the stop flange 49 to limit outward movement of the button 27 in the opening 25. A lip 54 on the front wall 50 engages the stop flange 49 to limit depression of the button 27. Advantageously, the button 27 can be snapped into position by engaging the tabs 48 into the slots 51', and then pressing a top of the button 27 so that the hook 53 snaps past the stop flange 49. Vertical side flanges 55 (FIG. 2) are provided on the bottom wall section 24 to slidingly engage sides of the button 27 to further stabilize the button 27 in the opening 25. The vertical side flanges 55 also stabilize the bottom wall section 24 of the bezel 23 to create a more robust and sturdy part, both before and after assembly of the bezel 23 onto the housing 21. As illustrated, the side flanges 55 include lateral flanges 56 that engage sidewalls 57 and 58 on the buttons 27 to further assist in providing a positive stop when depressing the button 27.

A switch 60 (FIG. 3) is provided on the PC board 36. The intermediate flange 48" abuts the PC board 36 at location 60' for optimal location of a depth of the PC board 36 relative to the bezel 23. The switch 60 includes a base portion 61 on the PC board, a conductor portion 62 raised above the PC board, and a resilient wall portion 63 that resiliently interconnects the base and conductor portions 61 and 62. Contacts are located below the conductor portion 62 on base portion 61. The conductor portion 62 engages and is attached to an end of the button wall 52, and the resilient wall portion 63 biases the conductor portion 62 and in turn, biases the button 27 to an outward non-actuating position.

When a person depresses the button 27, the resilient wall portion 63 flexes and rolls, such that the conductor portion 62 comes into contact with the contacts on base portion 61, thus completing the circuit of the switch 60. It is noted that many different switches are known in the art and can be used without departing from the present inventive concepts. For example, a tactile switch can be used instead of the "carbon pill" type switch 60 shown in FIG. 3.

The housing 21 (FIG. 3) includes an exterior surface formed by a bottom wall 66 and a back wall 67. A channel 68 (called a "finger rail" herein) is formed across a lower part of the back wall 67 near the bottom wall 66 at a location where a person's thumb or fingers naturally come to rest when the person is grasping and adjusting the mirror 20. The finger rail 68 forms a finger rail or groove along which a person can slide his/her fingers when trying to select and depress/operate a button 27. Notably, it is contemplated that the finger rail 68 could also be a raised ridge or any other elongated directional feature that can be felt. Protrusions 69 are formed in the finger rail 68 at locations aligned with the buttons 27. Thus, a person can, without looking at the mirror, start at one end of the mirror 20 and slide his/her fingers along the finger rail 68, counting the protrusions until they reach the button 27 for the electrical option that they want to select. It is contemplated that the protrusions can instead be depressions, surface roughness, or other features that let the driver know which button 27 that his/her fingers are at. Also, the protrusions can be Braille or symbolically shaped to communicate information to the driver by feel. Also, it is contemplated that the protrusions can be located on the buttons themselves, or on the bezel, if desired.

In the foregoing description, those skilled in the art will readily appreciate that modifications may be made to the invention without departing from the concepts disclosed herein. Such modifications are to be considered as included in the following claims, unless these claims by their language expressly state otherwise.

The present invention claimed is:

1. A rearview mirror comprising:
   a housing adapted to support a rearview mirror subassembly;
   a bezel attached to and partially covering a front of the housing, the bezel including a section of material defining a three-sided button opening having an open side on a face of the bezel; and
   a button positioned in the three-sided button opening and operably supported therein for movement between a switch-actuating position and a non-actuating position.

2. The rearview mirror defined in claim 1, wherein the button and the bezel include mating structure forming a hinge, the mating structure including at least one tab on one of the button and the bezel and including a mating slot on the other of the button and the bezel.

3. The rearview mirror defined in claim 2, wherein the button and the bezel further include stroke-limiting structure, the stroke-limiting structure including a hook on one of the bezel and the button and at least one stop on the other of the bezel and the button, the stop engaging the hook for limiting movement of the button when depressed.

4. The rearview mirror defined in claim 3, wherein an axis of the hinge is located at a bottom of the button and located rearwardly of the front of the bezel.

5. The rearview mirror defined in claim 1, wherein the button opening has an open bottom side that is completely open across a width of the button, and the button includes front and bottom surfaces that generally match a contour of corresponding front and bottom surfaces on the bezel.

6. The rearview mirror defined in claim 1, wherein the section of material defining the three-sided button opening includes rearwardly extending flanges on at least three sides of the button opening.

7. The rearview mirror defined in claim 1, wherein the bezel defines a chin section, and wherein a vertical height dimension of the button is at least about 50% of a vertical height of the chin section.

8. The rearview mirror defined in claim 7, wherein the vertical height dimension of the button is at least about 62% of the vertical height of the chin section.

9. The rearview mirror defined in claim 8, wherein the chin section defines a button panel area, and the vertical height dimension of the button is at least about 80% of a vertical height of the button panel area.

10. The rearview mirror defined in claim 1, including a locator on one of the bezel and the housing that is aligned with the button and arranged to facilitate a vehicle driver finding the button by feel without looking at the button.

11. The rearview mirror defined in claim 1, including a finger rail formed along a bottom of the housing, the finger rail being configured to facilitate a vehicle driver sliding his/her fingers along the finger rail to find the button.

12. The rearview mirror defined in claim 1, wherein the button is pivotally supported in the button opening for movement about an axis of rotation, the axis of rotation being located rearward of the face of the bezel and at a bottom of the button opening.

13. A rearview mirror comprising:
   a housing adapted to support a rearview mirror subassembly;
   a bezel attached to and partially covering a front of the housing, the bezel including a section of material defining a button opening on a face of the bezel, one of the housing and the bezel including an exterior surface that extends away from the face, and the button opening extending from the face around onto the exterior surface; and
   a button positioned in the button opening and operably supported by one of the housing and the bezel for movement between a switch-actuating position and a non-actuating position, the button including a front first surface that is generally flush with the face of the bezel when the button is in the non-actuating position and further including a second surface that is generally flush with the exterior surface of the bezel when the button is in the non-actuating position.

14. The rearview mirror defined in claim 13, wherein the front first surface of the button is recessed at least about 0.5 mm into the face of the bezel.

15. The rearview mirror defined in claim 13, wherein the button and the bezel include mating structure forming a hinge, the mating structure including at least one tab on one of the button and the bezel and including a mating slot on the other of the button and the bezel.

16. The rearview mirror defined in claim 15, wherein the button and the bezel further include stroke-limiting structure, the stroke-limiting structure including a hook on one of the bezel and the button and stops on the other of the bezel and the button engaging the hook for limiting movement of the button when depressed.

17. The rearview mirror defined in claim 16, wherein an axis of the hinge is located at a bottom of the button and located rearwardly of the front of the bezel.

18. The rearview mirror defined in claim 13, wherein the button opening has an open bottom side that is completely open across a width of the button, and the button includes front and bottom surfaces that generally match a contour of corresponding front and bottom surfaces on the bezel.

19. The rearview mirror defined in claim 13, wherein the section of material defining the three-sided button opening includes rearwardly extending flanges on three sides of the button opening.

20. The rearview mirror defined in claim 13, wherein a vertical height dimension of the button is at least about 50% of a vertical height of the chin section.

21. The rearview mirror defined in claim 13, including a locator on one of the bezel and the housing that is aligned with the button and arranged to facilitate a vehicle driver finding the button by feel without looking at the button.

22. The rearview mirror defined in claim 13, including a channel defining a finger rail formed along a bottom and rear of the housing, the finger rail being configured to facilitate a vehicle driver sliding his/her fingers along the finger rail to find the button.

23. The rearview mirror defined in claim 13, wherein the button is pivotally supported in the button opening for movement about an axis of rotation, the axis of rotation being located rearward of the face of the bezel and at a bottom of the button opening.

24. A bezel adapted to cover a front edge of a mirror housing for a rearview mirror, where the mirror housing is adapted to support a rearview mirror subassembly; the bezel comprising:

a ring-shaped body with top, bottom, and sidewall sections forming a loop one of the wall sections including a face and an exterior surface that extends away from the face, the face including marginal material defining a three-sided button opening that extends from the face onto the exterior surface; and a button positioned in the button opening and operably supported for limited movement by the marginal material of the bezel between a switch-actuating position and a non-actuating position.

25. The bezel defined in claim 24, wherein the button includes a front first surface that is generally flush with the face of the bezel when the button is in the non-actuating position and further including a second surface that is generally flush with the exterior surface of the bezel when the button is in the non-actuating position.

26. The bezel defined in claim 24, wherein the exterior surface is on a bottom of the ring shaped body.

27. The bezel defined in claim 24, wherein the button includes a vertical height that is at least 15% of a vertical height of the ring-shaped body.

28. A rearview mirror adapted for use in passenger vehicles, comprising.

a housing;

a rearview mirror subassembly supported in the housing, the rearview mirror subassembly including a reflector adapted to reflect images to a vehicle driver so that the vehicle driver can see toward a rear of the vehicle without turning his/her head, the reflector providing a reflective viewing area with a bottom edge.

a bezel attached to and partially covering a front of the housing and mirror subassembly, the bezel including a "chin" section of material below the bottom edge of the reflective viewing area that defines a button opening on a face of the bezel, a button operably positioned in the button opening with a vertical dimension that is at least 50% of a vertical dimension of the "chin" section.

29. The rearview mirror defined in claim 28, wherein the vertical height dimension of the button is at least about 62% of the vertical height of the chin section.

30. The rearview mirror defined in claim 29, wherein the chin section defmes a button panel area, and the vertical height dimension of the button is at least about 80% of a vertical height of the button panel area.

* * * * *